Feb. 1, 1938.  B. A. SWENNES  2,107,089
TRANSMISSION MECHANISM
Filed Jan. 17, 1934  3 Sheets-Sheet 1

Inventor:
Benjamin A. Swennes
By Axel E. [Hofgren]
Atty.

Feb. 1, 1938.  B. A. SWENNES  2,107,089
TRANSMISSION MECHANISM
Filed Jan. 17, 1934   3 Sheets-Sheet 2

Inventor:
Benjamin A. Swennes
By Axel A. Hofgren
his Atty.

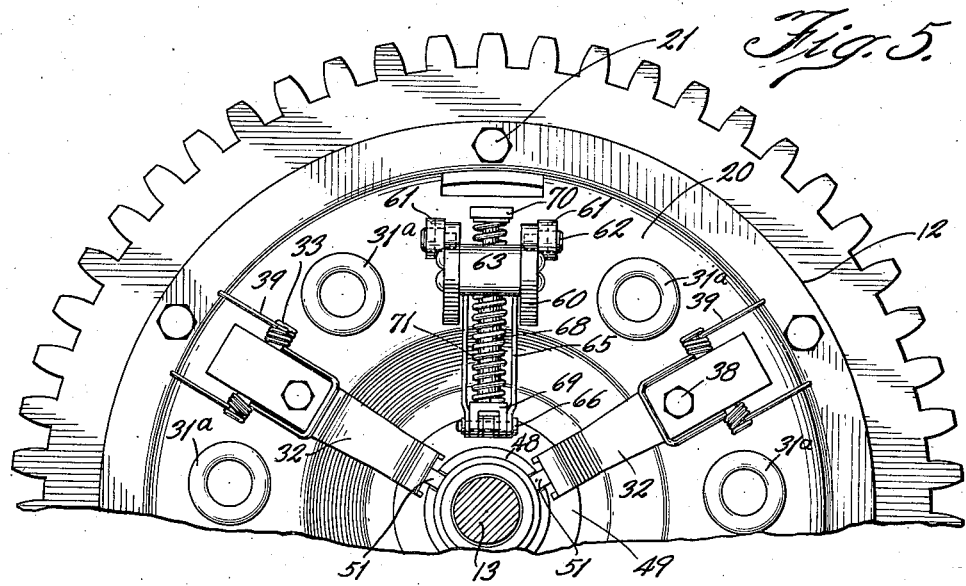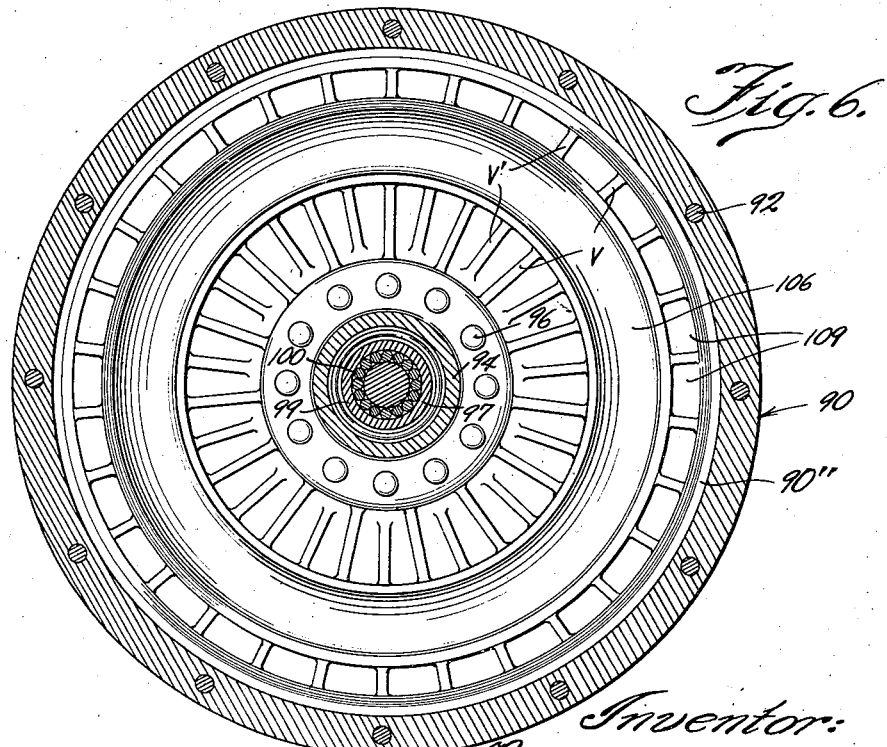

Patented Feb. 1, 1938

2,107,089

UNITED STATES PATENT OFFICE 2,107,089

TRANSMISSION MECHANISM

Benjamin Arthur Swennes, Rockford, Ill., assignor to Borg-Warner Corporation, Chicago, Ill., a corporation of Illinois Application January 17, 1934, Serial No. 706,993

18 Claims. (Cl. 74—189.5)

More particularly the invention relates to a transmission of a type adapted for use in automotive vehicles.

It is the general object of the invention to provide a new and improved transmission mechanism for connecting a drive shaft to a driven shaft.

Another object is to provide such a mechanism embodying reduction gearing for actuating the driven shaft positively at low speeds, and a hydraulic power transmitter connected in parallel with the gearing effective to pick up the load at higher speeds and provide a cushioned drive to the driven shaft independently of the gearing.

Another object is to provide a new and improved transmission mechanism for automotive vehicles embodying a reduction gearing for attaining low vehicle speeds, in combination with a hydraulic power transmitter of the fluid flywheel type so arranged that at low engine speeds the driven shaft is driven positively through the reduction gearing independently of the action of the fluid flywheel, thus eliminating the slip which would be present if the flywheel were serially in the transmission, and arranged so that at higher engine speeds the fluid flywheel will transmit power from the crank shaft to the driven shaft, automatically cutting out the reduction gearing.

Another object is to provide such a transmission mechanism embodying a reduction gearing provided with a freewheeling device which overruns when the load is picked up by the fluid flywheel.

Other objects will become readily apparent from the following detailed description taken in connection with the accompanying drawings, in which:

Fig. 5 is a fragmentary end elevation of the mechanical clutch device along the line 5—5 of Fig. 1.

Fig. 6 is a fragmentary section along the line 6—6 of Fig. 1.

Figure 1:
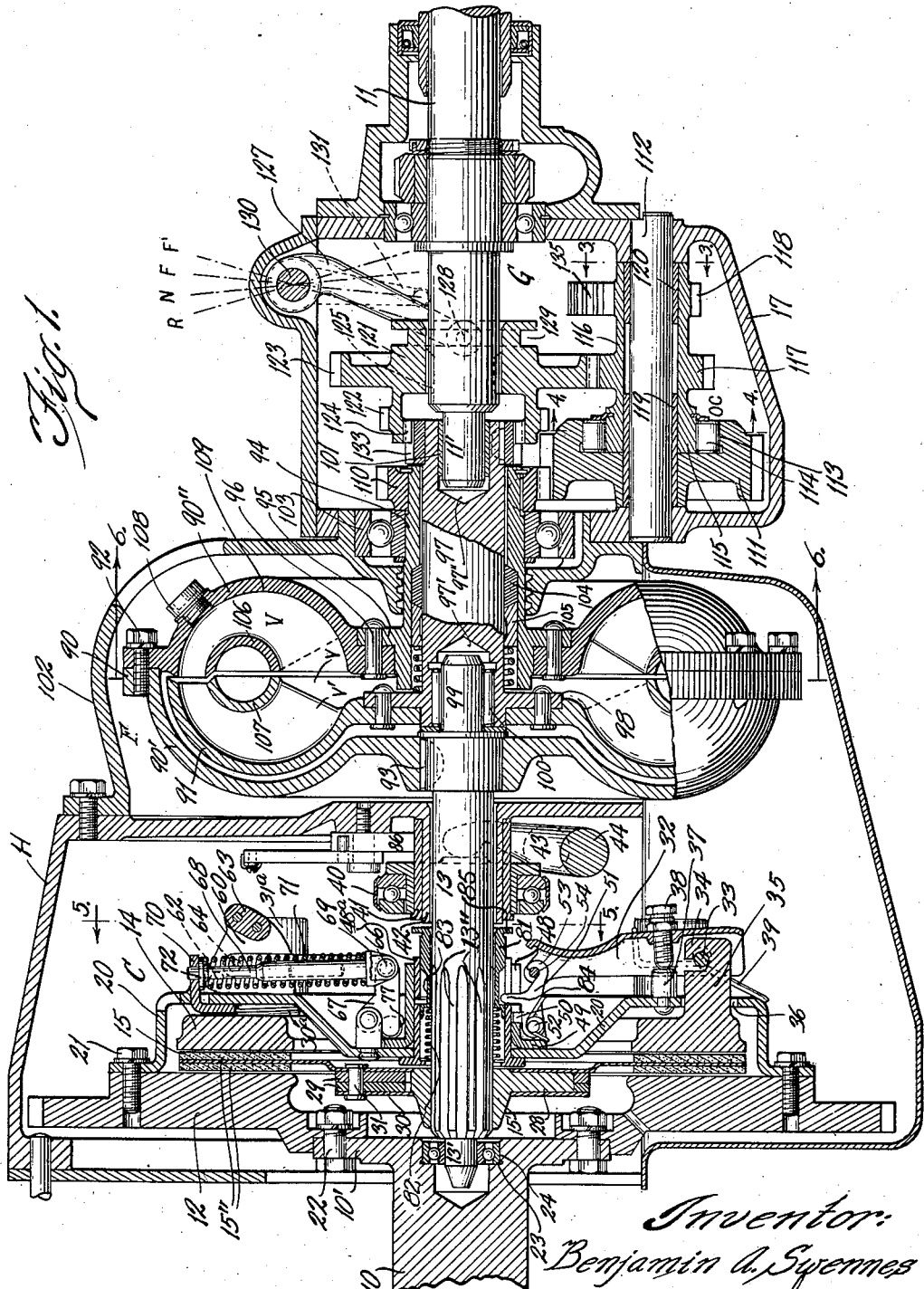
Fig. 1 is a longitudinal central section through a preferred form of the invention.

While the invention is susceptible of embodiment in many different forms, I have shown in the drawings and will herein describe in detail one such embodiment with the understanding that the present disclosure is to be considered as an exemplification of the principles of the invention and is not intended to limit the invention to the embodiment illustrated. The scope of the invention will be pointed out in the appended claims.

As illustrated in the drawings, and particularly in Fig. 1 thereof, the invention is embodied in a mechanism for establishing a driving connection between an engine crank shaft 10 and a driven shaft 11 coaxial with the crank shaft. The crank shaft carries a flywheel 12 and is arranged to be connected to a shaft 13 by means of an automatic clutch device C, of any preferred or desired form, which is contained in a housing H. As shown herein, this clutch device has a driving element mounted on and rotatable with the crank shaft 10, comprising a portion of the flywheel and an opposed annular pressure plate 14, and a driven element comprising a clutch disk 15 and the shaft 13 to which it is splined. The clutch is generally effective to connect the shaft 13 to the crank shaft 10 when the speed of the crank shaft 10 is increased above a first predetermined speed, for example a speed slightly higher than the normal idling speed of an engine in an automotive vehicle. The detailed construction and the operation of the clutch will be described hereinafter.

The power transmitting means connecting the driven element of the clutch device C with the driven shaft 11 includes a variable reduction gearing G, contained in a casing 17, and a fluid coupling F. When the speed of the crank shaft 10 is increased above the first predetermined speed the clutch device C is automatically engaged and the shaft 11 is driven through the gearing G. The fluid coupling F, however, is connected in parallel with the gearing G and when the speed of the crank shaft is increased the driving efficiency thereof increases so that the slip between the driving and driven parts of the fluid clutch reaches a ratio less than the speed ratio of the driving and driven shafts while the latter are operatively connected through the gear train and the fluid coupling becomes effective to transmit power directly from the driven element of the clutch device C to the shaft 11, exclusive or independently of the gearing G. The fluid clutch F is made of such dimensions as give it a power transmitting capacity capable of transmitting the full power of the vehicle engine and with but a relatively small amount of slip between the driving and driven parts of the clutch while the engine and the driving clutch part are rotating at a speed corresponding to engine speed during normal vehicular speed in high gear. In the exemplary form of the invention, the gearing G embodies an overrunning clutch or "freewheeling" device OC which overruns to permit the direct drive through the fluid coupling. By this arrangement a positive drive through the clutch device C and gearing G is obtained at the lower speeds, and the yieldable and shock-absorbing drive of a fluid coupling is obtained at the higher and more normal operating speeds. The clutch device C is positioned immediately adjacent the crank shaft 10, which herein comprises the driving shaft or element, in order that the clutch device will be effective to disconnect the driven shaft 11 completely from the driving shaft. Although the clutch device may assume various preferred forms, as illustrated herein the clutch is arranged to be operated either manually or automatically. When arranged for automatic operation the clutch is preferably ineffective when the shaft 10 is rotating at a low speed comparable to the idling speed of an automotive engine, the clutch being automatically engaged as the speed of the crank shaft is increased above the idling speed.

As mentioned hereinbefore the driving element of the clutch is mounted on and rotates with the shaft 10, an annular clutch housing 20, secured to the rear surface of the flywheel by screws 21, carrying the pressure plate 14. The flywheel is secured to a flange 10' on the shaft 10 by screw and nut devices 22. The shaft 13 passes through a central aperture in the housing 20 and has a trunnion 13' formed on its left hand end (Fig. 1) engaging a ball bearing 23 positioned in a recess 24 in the crank shaft 10.

The clutch disk 15 of the clutch device is slidably secured to the shaft 13, a hub 15' of the clutch disk being slidably mounted on splines 13'' on the shaft 13. The clutch disk carries the usual friction facing material 15'' on both sides, and may have a resilient mounting on its hub to soften engagement shocks, as well as prevent the transmission of torsional vibrations to the transmission gear train. The particular mounting shown in Figs. 1 and 2 may be termed a torque cushion since the hub has a series of projections 28 engaged by complementarily shaped rubber disks 29 held between a plate 30 and the clutch disk by rivets 31. The clutch disk is positioned between the right-hand or rear face of the flywheel 12 and the pressure plate 14, within the housing 20, the clutch disk serving to drive the shaft 13 when the pressure plate is advanced to clamp the clutch disk against the flywheel. As is usual practice in conventional manually operated clutches, the pressure plate is spring loaded by a plurality of pressure springs 30ª, located in pockets 31ª formed in the housing 20 and each bearing against the pressure plate with a predetermined pressure to provide the total pressure on the pressure plate required by the desired torque rating of the clutch.

Figure 2:
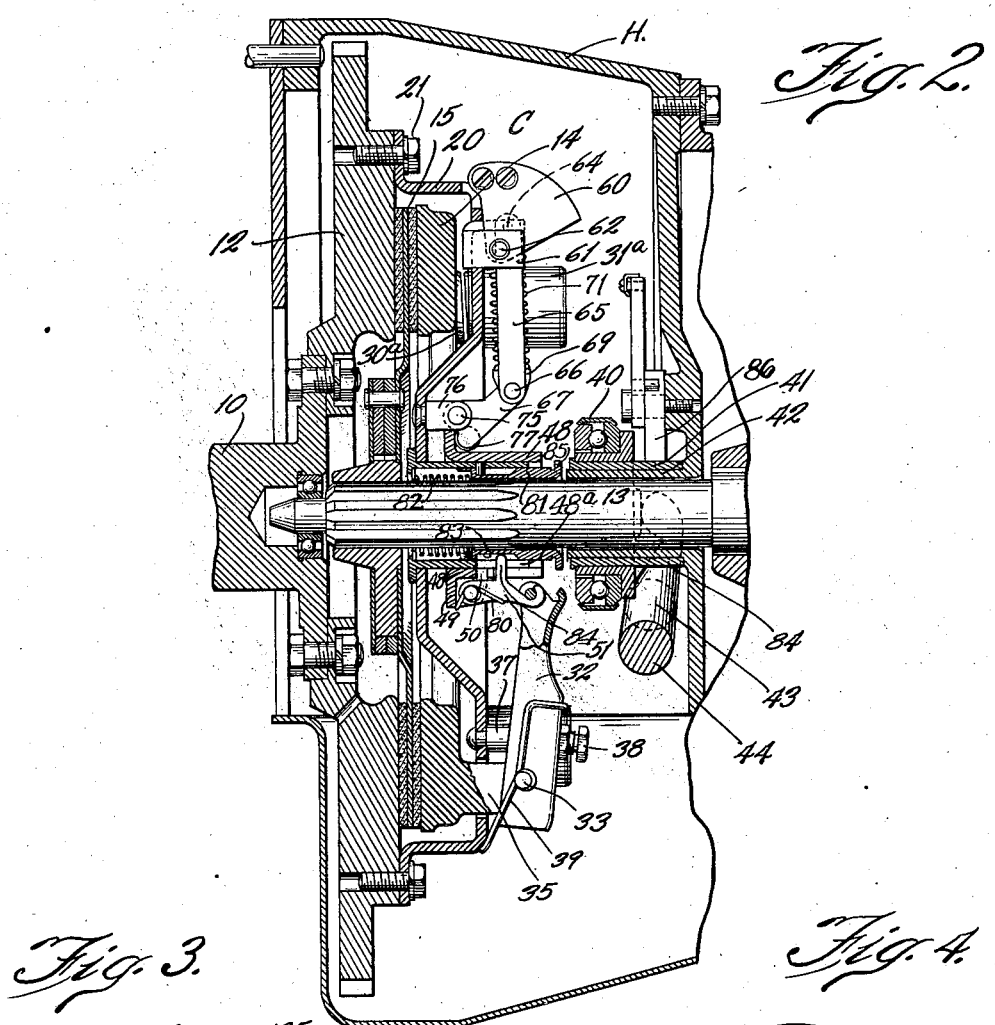
Fig. 2 is a fragmentary longitudinal central section through the mechanical clutch device showing the clutch engaged.

The pressure plate 14 is arranged to be moved against the action of the springs 30ª to release the clutch device, and as illustrated herein the releasing action is obtained by means including a plurality of angularly spaced throwout fingers 32 (Figs. 1, 2, and 5). The outer ends of these fingers carry pins 33 engaging in hooks 34 formed in bosses 35 projecting from the pressure plate through apertures 36 in the housing 20, the fingers being fulcrumed on buttons 37 on the housing by means of adjustable cap screws 38 carried on the fingers. The throwout fingers are retained on the bosses by means of torsion springs 39 coiled on the pins 33 and having the ends thereof engaging the fingers and housing respectively. The springs tend to shift the fingers in a counterclockwise direction about their fulcrums (Figs. 1 and 2) thus preventing rattling as well as taking up clearances at the hooks.

Disregarding for the moment the automatic features of the clutch, a manual control is provided, operable even when the clutch is under the control of the automatic mechanism, for disengaging the clutch through the use of the usual clutch pedal mechanism. This comprises a throwout bearing 40 slidably mounted on a sleeve 41 which in turn is slidable on a tubular extension 42 of the transmission housing H and surrounds the driven shaft 13. The throwout bearing 40 is adapted to be shifted to the left, (Figs. 1 and 2) by means of a fork 43 pivoted on a shaft 44 and engaging the bearing, to force the inner ends of the throwout fingers 32 toward the left from the position shown in Fig. 2 to that shown in Fig. 1.

The foregoing description embodies the usual features of conventional single disk clutches which are normally engaged and manually disengaged by the operator at will. There is also illustrated an automatic control that disengages the clutch automatically below a predetermined rotative speed unless the automatic control is locked out of engagement to convert the clutch to a conventional one wherein the clutch is always engaged unless deliberately held out of engagement by the operator.

The automatic mechanism which acts to hold the clutch disengaged below a predetermined speed of the drive shaft 10, and operates by centrifugal force to engage the clutch above such speeds, acts through a sleeve 48 concentric with the shaft 13 and slidable longitudinally thereof, on a tubular extension 48ª of the back plate 20, from the position shown in Fig. 1 to the position shown in Fig. 2. This sleeve has a radial flange 49 at one end and lugs 50, and carries pawls 51 pivoted to said lugs at 52, the pawls having hooks 53 engaging pins 54 on the inner ends of the throwout fingers 32. When the hooks are so engaged and with the automatic mechanism holding the sleeve in the position of Figure 1, against the housing 20, the clutch is automatically disengaged since the pawls act through the fingers 32 to retract the pressure plate 14. When the automatic mechanism is operated by centrifugal force, the sleeve 48 is released and moved to the right into the position of Figure 2 in response to the pressure of the springs 30ª which force the pressure plate to the left into clutching engagement and act through the pressure fingers and pawls to pull the sleeve 48 to the right. When the pawl hooks 53 are disengaged from the pins 54 by means hereinafter to be described the throwout fingers are fully under the control of the throwout bearing 40 and thus the clutch becomes a conventional manually operated one which remains fully engaged irrespective of the automatic control, the sleeve 48 remaining in its left hand position as shown in Fig. 1.

The automatic control, one element of which is shown in the upper portions of Figs. 1, 2, and 5, comprises pairs of spaced weight members 60 pivotally mounted on spaced lugs 61 on the housing 20 by pins 62. The weight members 60 have connecting bridges 63 to increase the effective weight and leverage of the assembly on its pivots 62. The assembled weights are so formed and pivoted as to swing outwardly in a radial plane relative to the clutch axis, under the influence of centrifugal force, into the position of Fig. 2, where the weights come to rest against the housing 20. Each member 60 carries fulcrum pins 64, offset relative to the pivots 62, which pins 64 are connected by links 65 to a pin 66 at the outer end of a lever 67. A spring guide rod 68 telescopes in the shank of a yoke 69 on the pin 66 and has its outer end secured to a lug 70 on the housing between the lugs 61. A coiled spring 71 is interposed between a collar 72 on the rod 68 and the yoke 69.

Each lever 67 to which the links 65 are connected and against which the spring 71 acts, is fulcrumed at 75 to a bracket 76 on the housing 20. The lever also carries an offset roller 77 bearing against the flange 49 of the sleeve 48, the arrangement being such that the combined forces of the springs 71 acting through the levers 67 and rollers 77 are sufficient to overbalance the clutch pressure springs 30ª acting on the sleeve 48 through the throwout fingers 32, thus holding the sleeve 48 in the position of Fig. 1 until centrifugal force swings the weights outwardly to release the pressure of the rollers 77 against the flange of the sleeve.

The spring 71 acts to oppose the outward movement or response of the weights to centrifugal forces acting thereon. It will be evident that the degree of preloading of the springs will determine the rotative speed at which the weights swing outwardly, since centrifugal force varies as the square of the rotative speed.

Automatic engagement of the clutch is dependent on the overbalancing of the springs 71 by the combined action of the springs 30ª, acting through fingers 32 on sleeve 48, and the weights 60, acting through links 65, the springs 71 having their force multiplied by the leverage acting on the rollers 77 while the springs 30ª have their force reduced by the leverage of the throwout fingers. Thus the sleeve 48 may float in a balanced position between these spring forces as long as the clutch is set for automatic operation. In practice, however, the springs 71 overbalance the opposing forces to a predetermined extent dependent upon the desired rotative speed of clutch engagement, the excess spring force acting to hold the weights in the position of Fig. 1 until increasing centrifugal force absorbs the excess spring force. Since the variables are under the designer's control the clutch can be designed to operate at a predetermined speed and to have a predetermined maximum torque capacity and rate of engagement.

It will be noted from Fig. 2 that with the clutch automatically and fully engaged it can still be manually disengaged by shifting the throwout bearing 40 to the left, the bearing acting through the throwout fingers to retract the pressure plate as well as forcibly to return the automatic mechanism to the position shown in Fig. 1 of the drawings. The effect of this is essentially to overcome the centrifugal force by a directly applied force of greater magnitude acting through the fingers 32.

Movement of the bearing 40 to the left in Fig. 1 also serves to disengage pawls 51 from the fingers 32 to remove the automatic mechanism from control of the clutch. To that end a sleeve 81 is slidably mounted on shaft 13 and urged outwardly of the tubular extension 48ª by a compression spring 82. The sleeve 81 is formed with longitudinal slots 83 to receive the ends of inwardly projecting fingers 84 on the pawls 51. At their rearward ends the slots are formed with cam surfaces which engage the fingers 84, when the sleeve is moved forward, to cause the hooks 53 to move radially outwardly out of engagement with pins 54 on the fingers 32. Forward movement of the sleeve 81 to effect such disengagement is imparted thereto as an incident to movement of the bearing 40 acting through sleeve 41 movable therewith and abutting a flange 85 on sleeve 81. The sleeve 81 may be locked in its forward position permanently to remove the automatic control by means of a dog 86 pivoted on the housing H to drop behind the sleeve 41 and prevent return thereof to normal position. Dog 86 is suitably controlled by manual means not shown.

The fluid coupling F which is herein shown in the form of a fluid flywheel comprises a driving element having an annular casing 90 and a driven element or runner 91. The casing is formed in sections 90' and 90" secured together at their peripheries by screws 92 and is herein mounted on the right hand end of the shaft 13 (Fig. 1) and secured thereto by means of a key 93 so as to rotate therewith. The casing 90 has a tubular extension 94 in the form of a sleeve having a flange 95 secured to the casing section 90" by means of a plurality of rivets 96. The runner 91 is secured to a shaft 97 which extends through the sleeve 94 and is concentric with the shafts 13 and 11 and is positioned between said shafts, the runner being riveted to an annular flange 98 on the shaft 97. This tubular portion of the casing 90 preferably extends into the casing 17 so that any fluid leaking along the shaft 97 passes into casing 17 and not out into the housing H. In addition, a packing ring 104 surrounds the shaft 97 within the tubular portion 94, and is automatically taken up by means of a spring pressed ring 105. A reduced end 99 of the shaft 13 is rotatably mounted in a recess 97' in the adjacent end of the shaft 97 by means of a plurality of rollers 100, and a reduced portion 11' of the shaft 11 is rotatably mounted in a recess 97" in the adjacent end of the shaft 97 by means of a sleeve bearing 101. The sleeve 94 is rotatably mounted in one end of a part 102 of the housing H (which part surrounds the fluid coupling), by means of a ball bearing 103 and projects into the adjacent gear casing 17. In this manner the shaft 13 and the fluid coupling casing 90 including the tubular portion 94 are connected together to rotate as a unit, being driven by the crank shaft 10 whenever the clutch device C is engaged.

As illustrated herein (Figs. 1 and 6) the driving element 90 of the fluid coupling F is provided with angularly spaced radially extending vanes V and V' which are somewhat semi-circular in form and project from the inner wall of the casing section 90". The vanes are intersected by an annular semi-cylindrical wall 106 so as to form a plurality of fluid ducts 109 decreasing in cross sectional area toward the outer portion of the casing. The runner 91 is positioned in opposed relation to the impeller vanes of the driving element and conforms somewhat in shape to the adjacent portion of the casing 90. The runner may also be provided with vanes V and V' similar to those on the driving element and, in the form illustrated in the drawings, the runner vanes are intersected by a corresponding annular semi-cylindrical wall 107. The alternate vanes V' are herein cut off slightly adjacent their inner ends compared to the vanes V. The casing section 90" is provided with a screw plug 108 which may be removed for the purpose of filling the casing with a suitable fluid such as oil. During operation of the fluid coupling, fluid is forced outwardly through the ducts formed in the driving element or impeller and into the ducts formed in the driven element or runner in a well known manner. At relatively slow speeds the slip is high, but as the speed of the driving element increases the torque transmitted to the runner increases until a speed is attained where the runner is rotated by the impeller with a relatively small amount of slip, thus forming a substantially direct and cushioned drive between the shaft 13 and the runner shaft 97.

Figure 4:
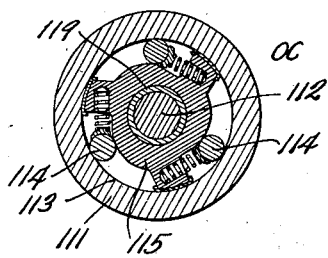
Fig. 4 is a section along the line 4—4 of Fig. 1.

In the preferred form of the invention the driven shaft 11 is arranged to be driven from the tubular portion 94 of the casing 90 through the gearing in the transmission casing 17 when the engine crank shaft is rotating below a speed at which the fluid coupling is effective to drive the shaft 11. Sleeve 94 projects into the transmission casing 17 and carries a gear 110 which meshes with a wide faced gear 111 rotatably mounted on a parallel stub shaft 112. The gear 111 has an annular recess 113 in one end (Figs. 1 and 4) in which the rollers 114 and cam 115 of the overrunning clutch or freewheeling device OC are positioned. The cam 115 is herein shown as formed integrally with a sleeve 116 and gears 117 and 118, being rotatably mounted on the shaft 112 by means of sleeve bearings 119 and 120. A shiftable cluster gear element 121 is slidably mounted on and splined to the adjacent end of the driven shaft 11 and comprises spur gears 122 and 123 and a toothed clutch element 124. This cluster gear has splines 125 engaging slots 126 in the shaft 11 and is arranged to be shifted longitudinally of the shaft 11 by means of arms 127 which carry pins 128 engaging in a peripheral slot 129 in the hub of the cluster gear, the cluster gear in the present instance having four operative positions on the driven shaft 11. The arms 127 are secured to a transversely extending control shaft 130 which shaft also has secured thereto an operating arm 131. The four operative positions of the operating arm 131 are herein designated by dot and dash lines F', F, N, and R, designating two "forward" speeds, "neutral" and "reverse", respectively. The cluster gear is shown in the normal forward driving position F with the gear 123 meshing with the gear 117, the drive from the sleeve 94 to the driven shaft 11 then being through gears 110 and 111, the freewheeling clutch OC and gears 117 and 123. In this "forward" position of the cluster gear, the toothed clutch element 124 meshes with a wide faced gear 133, acting as a complementary clutch element, on the adjacent end of the shaft 97 to complete the driving connection between the runner 91 and the driven shaft 11.

Figure 3:
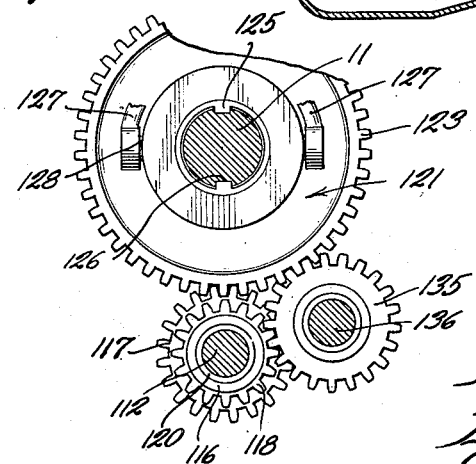
Fig. 3 is a fragmentary section along the line 3—3 of Fig. 1.

When the arm 131 is moved to the position N the gear 123 is disengaged from the gear 117 and the clutch element 124 is disengaged from the clutch element 133 on the end of the runner shaft 97, the transmission then being wholly disconnected from the driven shaft 11. Upon a further movement of the arm 131 counterclockwise to the position R, the gear 123 is moved toward the right (Fig. 1) into engagement with a reverse gear 135 (Figs. 1 and 3) which is mounted on a short shaft 136 parallel to the shaft 112, and is in constant mesh with the gear 118.

Sleeve 94, gear 110, gear 111, OC, gear 117, and gear 123 constitute a first power train for driving driven shaft 11 from sleeve 94 with the parts as shown in Figure 1. When gear 122 is moved to the left (Figure 1) to mesh with broad gear 111, there is provided a second power train between sleeve 94 and driven shaft 11. By means of the second power train it is possible to use the engine as a brake, thereby eliminating the freewheeling action as explained below.

If it is desired to cut out the freewheeling clutch during the forward drive of the driven shaft, the cluster gear may be shifted toward the left (Fig. 1) until the arm 131 is in the position F', whereupon the clutch element 124 is engaged with the clutch element 133 on the runner shaft and the gear 122 of the cluster gear is engaged with the gear 111. The shaft 11 is then driven from the driven element of the clutch C directly through the fluid coupling casing, gears 110, 111, and 122, the gear 111 acting as an idler gear. In this position of the cluster gear the engine is effective for braking purposes.

By this arrangement a positive drive through clutch C and the gearing in casing 17 is available for positively accelerating a vehicle, while at the same time the cushioned drive through the fluid coupling is available at the higher and more normal operating speeds. The starting and accelerating may be entirely automatic, the low speed positive drive being completed automatically by the clutch C (when the cluster gear 121 is in the position of Fig. 1) upon the increase of the crank shaft speed. As the vehicle accelerates due to further increases in engine speed, the efficiency of the fluid coupling increases to a point where the fluid coupling becomes effective to drive the shaft 11, overrunning the clutch OC. This transfer of drive from the gearing to the fluid coupling is automatic and without shock.

Since the clutch C is always engaged automatically at the same rotative speed it may be accurately adjusted to give the desired varying slip during pull-in. The fluid coupling furnishes a cushioned coupling for normal driving and also yields so that the drive is through the gearing whenever the load becomes too great for the fluid coupling.

I claim as my invention:

1. A transmission mechanism for automotive vehicles comprising, in combination with a drive shaft and a driven shaft, a mechanical clutch device having the driving element thereof connected to said drive shaft, a fluid coupling comprising an annular fluid-tight casing carrying internal impeller blades forming a driving element, and a runner enclosed in said casing forming a driven element, means connecting the driven element of said clutch device to the driving element of the fluid coupling, means connecting the driven element of said clutch device to said driven shaft and including the first mentioned connecting means, reduction gearing and an overrunning clutch in serial relation, means connecting the driven element of said fluid coupling to said driven shaft, means operable automatically upon an increase in the speed of said drive shaft above an idling speed to engage said mechanical clutch device, means in said fluid coupling effective coincidently with a further increase of speed to drive the driven element thereof and transmit the power of the drive shaft to the driven shaft at a higher speed than through said gearing, overrunning said clutch, and means for alternatively connecting the driving element of the fluid coupling to the driven shaft independently of said overrunning clutch.

2. In combination with a drive shaft and a driven shaft, transmission mechanism comprising a gear casing into which the driven shaft extends, shiftable gearing in said casing including a first gear and a second gear, a clutch device, one element of which is carried on and rotates with the drive shaft, a fluid flywheel having a casing-impeller element and a runner element positioned within the casing-impeller element, means connecting said casing-impeller element to the driven element of said clutch, a shaft on which said runner element is mounted, which shaft projects into said gear casing and carries said first gear, and a tubular extension on said casing-impeller element surrounding said shaft and extending into said gear casing and carrying said second gear.

3. In a transmission mechanism comprising a fluid flywheel having an annular casing closed at one end, and a runner within said casing, a gear casing and shiftable gearing in said gear casing, in combination, a shaft connected to and driven by said runner and extending into said gear casing, and a tubular extension on said annular casing surrounding said shaft and also extending into said gear casing so as to discharge any fluid, leaking along the runner shaft, into the gear casing.

4. In combination with a drive shaft and a driven shaft, transmission mechanism comprising a gear casing into which the driven shaft extends, shiftable gearing in said casing, a clutch device one element of which rotates with the drive shaft, a fluid flywheel having a casing-impeller element and a runner element positioned within the casing-impeller element, means connecting said casing-impeller element to the other element of said clutch, a shaft on which said runner element is secured, which shaft projects into said gear casing, and a tubular extension on said casing-impeller element surrounding said shaft and extending into said gear casing so that any fluid leaking along the runner shaft is discharged into the gear casing.

5. A transmission mechanism comprising a rotatable mechanical clutch, a fluid clutch including an impeller and a rotatable runner, a driving connection between said mechanical clutch and said impeller, concentric driven members, one of said concentric members being coupled with said runner for rotation therewith, the other of said concentric members being coupled with said impeller for rotation therewith, and locking means operable to effect a coupling causing common rotation of said concentric members.

6. A transmission mechanism comprising a fluid coupling device including an impeller and a runner, concentric members driven respectively by said impeller and said runner, a shaft adapted to be individually driven by either of said concentric members, and means for coupling together said concentric members and said driven shaft for common rotation.

7. A transmission mechanism comprising coaxial driving members, a driven member coaxial with said driving members, power transmitting means bridging said drive members and said driven member whereby the latter may be individually driven from either of said driving members, and means for inter-connecting all of said members for common rotation.

8. A transmission mechanism comprising coaxial driving members, a driven member coaxial with said driving members, a releasable direct coupling between one of the driving members and said driven member, adjacent gears respectively on the other of said driving members and said driven member, and a gear co-meshable with said adjacent gears to interlock said other driving shaft and said driven shaft.

9. A transmission mechanism comprising coaxially rotatable power transmitting members, means whereby one of said members is yieldingly urged to rotate in the same direction as the other, a driven member, a direct driving connection between said one member and said driven member, a one-way drive speed reduction connection between the other of said members and said driven member, and means for connecting both of said coaxial members with said driven member for common rotation therewith.

10. Change speed power transmission mechanism comprising coaxially rotatable power shafts, a gear on one of said shafts, a clutch member on the other of said shafts, a driven shaft, a gear on said driven shaft, a clutch member on said driven shaft and cooperable with the first named clutch member, said clutch members being relatively movable into power transmitting relation, and a power train including a broad gear and a one-way drive connection in series therewith, said power train being disposed in power transmitting relation between said one of the coaxial shafts and said driven shaft and with said broad gear and the first named gear in mesh, said broad gear and the gear on said driven shaft being relatively movable into meshed relation while preserving the meshed relation of said broad gear and the first named gear, and said clutch members being engageable either concurrently with or non-concurrently with the meshed relation of the broad gear and the first named gear.

11. Change speed power transmission mechanism comprising a flexible coupling device including driving and driven rotative parts wherein the driven part has a tendency to follow the rotation of the driving part, a driven shaft, a power train of a selected speed ratio including in series therewith an overrunning connection, said power train being disposed in power transmitting relation between said driving part and said driven shaft, a second power train between said driving part and said driven shaft, and coupling means for connecting said driven part and said driven shaft independently of the drive through said power train of selected ratio.

12. Change speed power transmission mechanism comprising a flexible coupling device including driving and driven coaxially rotatable parts wherein the driven part has a tendency to follow the rotation of the driving part, a gear rotatable with said driving part, a clutch member rotatable with the driven part, a driven shaft rotatable coaxially with said parts, a gear power train including a broad gear and a one-way drive connection in series, said power train being drivingly disposed between said driving part and said driven shaft and with said broad gear enmeshed with said driving part gear, a movable clutch member on said driven shaft, a movable gear on said driven shaft, said movable clutch member being disposable in coacting relation with the driven clutch part for directly coupling such driven part directly with the driven shaft, and said movable gear being disposable in meshed relation with said broad gear while said driving part gear is meshed therewith.

13. A transmission mechanism for automotive vehicles comprising, in combination with a drive shaft and a driven shaft, a mechanical clutch device having the driving element thereof connected to said drive shaft, a fluid flywheel comprising driving and driven elements, means connecting the driven element of said clutch device to the driving element of the fluid flywheel, a power train of selected speed ratio connecting the driving element of said fluid flywheel to said driven shaft and including an overrunning clutch in serial relation therewith, a power train of higher speed ratio for connecting the driven element of said fluid flywheel to said driven shaft exclusive of said first power train and overrunning clutch, means operable automatically upon an increase in the speed of said drive shaft above an idling speed to engage said mechanical clutch device, and fluid in said fluid flywheel effective coincidental with a further increase in speed of the drive shaft to drive the driven element thereof and transmit the power of the drive shaft to the driven shaft through said power train of higher speed ratio as permitted by said overrunning clutch.

14. A transmission mechanism for automotive vehicles comprising, in combination with a drive shaft and a driven shaft, a fluid coupling connecting said shafts comprising an annular fluid-tight casing carrying internal impeller blades forming a driving element, and a runner enclosed in said casing forming a driven element, automatic clutch means connecting said driving element to said drive shaft, means connecting said driven element to said driven shaft, a positive drive means comprising a reduction gearing and an overrunning clutch in serial relation between said driving element and said driven shaft, said positive drive means being effective at lower drive shaft speeds when the slip of the fluid-coupling is high, said fluid coupling being effective to transmit power through said means connecting said driven element and said driven shaft at higher drive shaft speeds incident to overrunning said clutch.

15. In combination with a drive shaft and a driven shaft, transmission mechanism comprising a clutch device including driving and driven elements of which the driving element is driven by said drive shaft, a fluid flywheel comprising an impeller and a runner, means connecting said impeller to the driven element of said clutch device, a gear box into which one end of said driven shaft extends in axial alinement with said drive shaft, a first member driven by said impeller, means connecting said member and driven shaft including an overrunning clutch, a second member driven by said runner, means connecting said second member with said driven shaft so that as the speed of the drive shaft increases and the efficiency of the fluid flywheel correspondingly increases the runner will become effective to drive the driven shaft and overrun said overrunning clutch.

16. A transmission mechanism for automotive vehicles comprising in combination a drive shaft and a driven shaft, an automatic clutch having a driving element connected with the drive shaft and a driven element, a fluid flywheel having an annular casing forming an impeller element and a runner rotatable within said casing, means connecting said runner to the driven shaft, means connecting the driven element of said mechanical clutch to the impeller element of said fluid flywheel, and means including the impeller element of said fluid flywheel and an overrunning clutch connecting the driven element of the mechanical clutch to the driven shaft.

17. A change speed transmission comprising driving and driven shafts, a fluid medium clutch including driving and driven parts, clutch mechanism for drivingly connecting the driving shaft with said driving part, a power train of selected speed ratio including an overrunning connection interposed operatively between said driving part and the driven shaft, and a power coupling interposed between said driven part and said driven shaft, said fluid medium clutch being adapted upon an increase in speed to transmit sufficient torque from the driven part for driving the driven shaft at a speed greater than it is driven through the power train of selected speed ratio, and said overrunning connection permitting of such greater speed of the driven shaft.

18. Transmission mechanism comprising a fluid coupling device including driving and driven parts, automatic clutch means for driving the driving part of said device, a driven shaft, a demobilizable power train of selected speed ratio in power transmitting relationship between said driving part and said driven shaft, a power coupling between said driven part and said driven shaft, said device becoming operative upon increased speed of the driving part thereof to develop torque adequate for driving said driven shaft from said driven part through the power coupling at higher speed, and means automatically operable to effect demobilization of the power train of selected ratio when the driven shaft is driven at such increased speed.

BENJAMIN ARTHUR SWENNES.